Sept. 18, 1951     D. E. SUNSTEIN ET AL     2,568,098
SIGNAL COMPARATOR EMPLOYING SECONDARY EMISSION APPARATUS
Filed Jan. 17, 1947
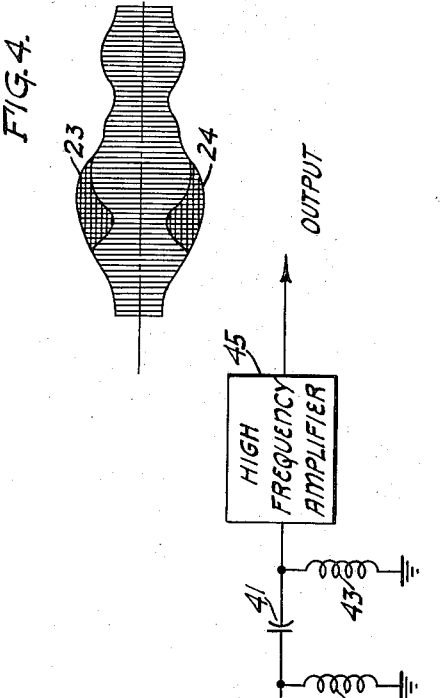
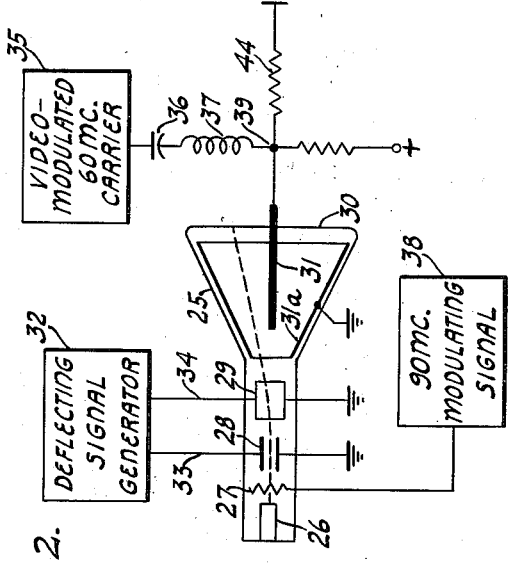
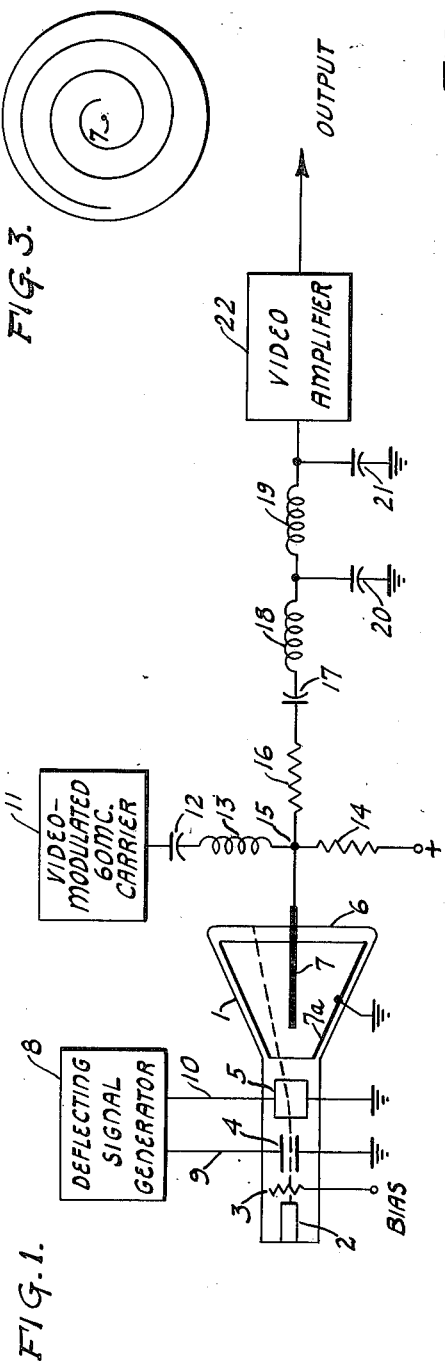
INVENTORS
DAVID E. SUNSTEIN and
ARTHUR H. MANKIN
BY
*Brown, Denk & Lynnestvedt*
AGENTS

UNITED STATES PATENT OFFICE 2,568,098

SIGNAL COMPARATOR EMPLOYING SECONDARY EMISSION APPARATUS

David E. Sunstein, Cynwyd, and Arthur H. Mankin, Philadelphia, Pa., assignors to Philco Corporation, Philadelphia, Pa., a corporation of Pennsylvania Application January 17, 1947, Serial No. 722,580

4 Claims. (Cl. 250—27)

This invention relates to methods of and means for comparing the forms of electrical wave signals occurring successively in time and for providing indications of differences in the waveforms of such signals. It also relates to methods of and means for detecting aperiodicity of electrical wave signals at any desired predetermined frequency. For this purpose it utilizes a phenomenon which is common to various dielectrics and numerous fluorescent materials such as are customarily used in cathode ray tubes and similar devices. It is observed that such materials, in response to initial bombardment by electrons or other charged particles forming a beam of predetermined intensity, emit secondary electrons at a certain rate; and that in response to subsequent bombardment of the same materials by electrons forming a beam of the same intensity, fewer secondary electrons are emitted. In general it is found that, after several successive bombardments of the same material, an equilibrium condition is reached at which successive bombardments produce substantially equal quantities of secondary electrons.

The invention is particularly applicable in object motion indicators of the reflection type in which high frequency energy is radiated so as to impinge upon a terrain area or upon objects variously disposed in space; in which reflections are selectively received from different points on the terrain or from different objects in space; in which the equipment is controlled so as successively to receive reflections from the same terrain area or from the same direction in space; and in which comparison is made between successive reflections from the same area or from the same directions, whereby differences in the magnitudes of such reflections may be noted and used to indicate changes in the reflective properties at certain points on the terrain or at certain regions in space, which may be attributable to motion of target objects in the vicinities of such points or regions. Thus, in the absence of changes in the reflective configuration of the area or region under observation between the reception of successive reflections, the signal received will recur upon successive observations thereof. However when the reflective configuration changes during the time between successive observations, owing, for example, to the motion of a target in the area or region observed, the received signal will differ in successive scans.

Various methods are known and have been used for detecting such differences. Thus, for example, it is known to delay the signal produced in one observation of a given area or region by an amount equal to the interval between successive observations, and to subtract from the delayed signal the signal resulting from the next observation to yield a difference signal. Systems employing this method are generally rather bulky and not well suited for airborne use owing to the necessity for using considerable equipment in order to obtain the long delays required. Another method involves the use of a conventional cathode ray tube, adjacent the screen of which is placed a capacity plate substantially coextensive therewith. It has been found that if, in response to successive signals of substantially identical form, the same trace is repeatedly scanned on the screen of the tube, no signal will be induced in the capacity plate. If, however, there is a change in waveform of the signal used to control the scanning, a signal will thereupon be induced in the capacity plate, which is usable to indicate such change. For some uses this arrangement is disadvantageous owing to the high capacity to ground introduced by the plate.

In a system of the latter type, it is desirable to use a trace which is as long as possible in each successive scan. A linear trace extending across the face of a conventional cathode ray tube does not, as will be apparent, utilize efficiently the entire area of the cathode ray tube screen. A zig-zag trace, on the other hand, although it provides for more efficient utilization of the screen area, is usually objectionable for the reason that discontinuities are introduced at the points at which the trace changes direction. Hence it has been found convenient to utilize a recurrent trace of spiral configuration which may commence at a point near the periphery of the screen and proceed with gradually diminishing radius of curvature toward the center thereof. Such a trace can be produced by applying appropriate deflecting signals to the horizontal and vertical deflecting plates of a conventional electrostatically deflectable cathode ray tube as set forth, for example, in copending application of Allen C. Munster and David E. Sunstein, Serial No. 708,540, filed November 8, 1946, now Patent No. 2,491,684. The cathode ray beam is then further deflection-modulated in response to the received reflected signal. If this signal repeats itself periodically at the trace repetition rate, the trace produced will depart radially from the original spiral by like amounts at corresponding points in successive scans. However, when the received signal differs in successive scans, the departure at corresponding points will differ and the successive traces will not be identical. To effect radial deflection of the electron beam in response to the received signal, it is convenient to utilize, in an otherwise conventional cathode ray tube, an electrostatic deflecting element or electrode which enters the tube envelope through the center of the screen and is substantially coincident with the longitudinal axis of the tube. Such a deflecting electrode is adapted, in response to signals applied thereto, to exert radial deflecting forces upon the cathode ray beam as it describes the spiral trace on the tube screen. When, however, there is employed a capacity plate as above mentioned to derive output signals indicative of aperiodicity, a further difficulty results owing to capacitive coupling between the axial electrode and the capacity plate. The present invention is adapted to eliminate this difficulty, while providing numerous other advantages.

In accordance with the invention there is employed a conventional cathode ray tube provided with an axial deflecting electrode of the sort just referred to, but omitting the capacity plate heretofore used. The screen of the tube may either be covered with a phosphor, as in the conventional form of tube, or the phosphor may be omitted entirely, since satisfactory secondary emission is obtainable merely by the impingement of an electron beam on the glass forming the tube envelope. As in the device employing the capacity plate referred to hereinabove, the beam is preferably caused repeatedly to describe a spiral trace on the face of the tube, and received reflected signals are applied to the axial deflecting electrode to deflection-modulate the beam. If the received signal thus applied is periodic at the trace repetition rate, identical traces will be produced on successive scans, and after several scans, the secondary electron output from the tube screen will become and remain essentially constant throughout each scan and during successive scans. When, however, the received signal departs from periodicity, a new trace will be scanned and there will be a momentary increase in the secondary emission. Some of the secondary electrons thus emitted may be collected by means of a suitably biased electrode disposed in the vicinity of the tube screen. In fact, in accordance with a further feature of the invention, this electrode may be the axial deflecting electrode to which the received signals are applied to deflection-modulate the electron beam. When operated in accordance with the invention, as will hereinafter be set forth, it is possible almost completely to avoid any interaction between the received signal applied to the axial electrode and the signal developed thereon by the collection of secondary electrons emitted by the tube screen. Thus there is made available a signal which varies as a function of the secondary emission from the tube screen when the applied signal departs from periodicity at the repetition rate of the spiral scan.

Having set forth in outline the general principles and mode of operation of the invention, its objectives may be summarized as follows:

(1) To provide a secondary emission apparatus in which a single electrode is adapted for use in controlling the deflection of an electron beam and in deriving an output signal which is a function of the secondary electron emission from a target in response to impingement by said beam;

(2) To provide an improved signal waveform comparator;

(3) To provide an improved signal waveform comparator utilizing the phenomenon, exhibited by certain dielectrics and fluorescent materials, that their secondary emission in response to subsequent excitation of a predetermined intensity differs from that in response to initial excitation of similar intensity;

(4) To provide an improved signal waveform comparator in which a secondary-electron emissive target screen is successively scanned under control of signals whose waveforms are to be compared, in such a manner that substantially the same screen area is scanned in response to signals of the same waveform, but different areas are scanned in response to signals of different waveform, and in which variations in the secondary emission of said screen are used to provide indications of differences in the waveforms of said signals;

(5) To provide an improved detector of aperiodic signals in which a target screen is repeatedly scanned at a predetermined rate, under control of a signal whose aperiodicity at said rate is to be detected, in such manner that the same area is retracted on successive scans while the signal remains periodic at said rate, but new areas of the screen are scanned whenever the signal departs from periodicity at said rate, and variations in the secondary emission of said screen produced by scanning of such new areas serve to indicate aperiodicity of the signal;

(6) To provide a signal waveform comparator in which a target screen is successively scanned by an electron beam, in which signals whose waveforms are to be compared are successively applied to an electrode disposed in deflection controlling relation to said beam and in which said electrode is further utilized to collect secondary electrons emitted by said screen, variations in the quantity of secondary electrons thus collected being used to provide an indication of aperiodicity in said signal; and (7) To provide a signal waveform comparator in which a secondary-electron emissive target screen is successively scanned by an electron beam under control of signals whose waveforms are to be compared, in which variations in the secondary electron emission from said screen are used to indicate differences in the waveform of said signals, in which the means used to measure said emission introduce a minimum of undesired capacity, and in which there is a minimum of undesired coupling between the means used to control the scanning of said electron beam and the means used to measure said secondary emission.

Other objects and advantages of the invention will become apparent from a consideration of the following detailed description with reference to the drawings, in which:

Figures 1 and 2 illustrate different representative embodiments of the invention, Figure 3 illustrates the general form of the spiral traces described upon the screens of the cathode ray tubes in the embodiments of Figures 1 and 2, and Figure 4 illustrates, in enlarged detail, the nature of a portion of a trace and the manner in which it is modified by the occurrence of an aperiodic signal.

Referring now to Figure 1 there is shown a cathode ray tube 1, comprising: an electron gun 2 adapted to produce a beam of electrons directed along the longitudinal axis of the tube, a control grid 3 to which is applied a suitable bias for controlling the intensity of the electron beam, vertical and horizontal electrostatic deflecting plates 4 and 5 respectively laterally spaced from the tube axis, an axially disposed electrode 7 which preferably may enter the envelope of the tube through its screen or face 6, and an auxiliary electrode 7a which may be of frusto-conical form coaxial with electrode 7 and which is adapted to cooperate with electrode 7 in the deflection of the electron beam from gun 2. Screen 6 may either be covered with fluorescent material, as in the conventional form of cathode ray tube used to observe the forms of electrical signals, or it may be completely devoid of such coating, its sole purpose, in the present application, being to emit secondary electrons in response to impingement thereon of the electron beam from source 2. It is found that this phenomenon obtains regardless of whether or not the screen is coated, and since no visible output is required, there is no need to provide a screen which will emit light in response to electron bombardment. It may, however, be convenient to provide such a screen for purposes of testing the equipment. From a deflecting signal generator 8 are supplied to deflecting plates 4 and 5, through connections 9 and 10 respectively, deflecting potentials preferably adapted to cause the electron beam to move in a spiral conical path and to describe, on screen 6, a spiral trace which may commence at a point near the periphery of the screen and proceed toward the center thereof in the manner illustrated in Figure 3. As will be apparent, the deflecting signals required to produce such a trace are damped sinusoidal oscillations applied respectively to the horizontal and vertical deflecting plates 4 and 5 in substantially phase quadrature relationship. It is arranged that these signals recur periodically at a predetermined rate so that the electron beam will periodically and repeatedly retrace, in successive scans, the spiral trace corresponding to that shown in Figure 3. For reasons which will presently become apparent, the rate at which this scanning is repeated should correspond either to the normal fundamental frequency of the signal whose aperiodicity at said frequency is to be detected, or to a submultiple of this fundamental frequency. For example, where the invention is to be applied in a radar target motion indicator, the repetition rate may correspond to the rate at which successive pulses of high frequency energy are transmitted by the radar for reflection from target objects.

Axial electrode 7 and auxiliary electrode 7a are so disposed with reference to the electron beam as to be capable of exerting radial deflecting forces thereon in response to signals supplied to them, so as to cause the beam to depart radially from the spiral trace illustrated in Figure 3. Electrode 7a is preferably grounded, while to electrode 7 is supplied the signal whose aperiodicity at the trace repetition rate is to be determined. So long as the signal thus supplied continues periodic at the trace repetition rate, the beam will be deflected from the spiral trace by like amounts at corresponding points in successive scans. When, however, a departure from periodicity occurs, as evidenced by a difference in waveform between successive cycles of the signal at the trace repetition frequency, the departures from the spiral trace will not be identical for all pairs of corresponding points in successive scans, and the trace produced in a preceding scan will not be repeated in a subsequent scan. For reasons which will presently be seen, the signal whose aperiodicity is to be measured is supplied to electrode 7 modulated upon a carrier signal whose frequency is outside the band occupied by the frequency components of the modulating signal. In a radar target motion indicating system, this modulated carrier wave signal may conveniently be the intermediate frequency signal produced in the receiver circuits. In the circuit illustrated in Figure 1, such a signal, comprising a video-modulated 60 megacycle carrier, is supplied from a source 11 to axial electrode 7 through a series resonant circuit comprising condenser 12 and inductor 13 tuned to the 60 megacycle frequency. The envelope of this modulated signal will vary in accordance with variations in the amplitude of reflections of terrain or target objects received by the radar, and, so long as the reflective configuration remains the same, will recur periodically at the radar pulse repetition rate which corresponds to the trace repetition rate of the circuits presently being described. However, when a change in the reflective configuration occurs, as, for example, when a particular target object moves, the envelope of the modulated carrier-wave signal will not repeat itself in successive scans. This will cause the electron beam of tube 1 to describe a trace at least somewhat different from that described in the preceding scan.

Considering now the operation of tube 1 as affected by the signals applied to axial electrode 7, let it be assumed that power is supplied to the tube (from sources not shown) to cause electron gun 2 to produce an electron beam, and that, in response to deflecting signals supplied from generator 8 and the signal supplied to axial electrode 7 from source 11, the beam is caused to describe an initial trace on screen 6. As the trace is swept out, each point of screen 6, on which the electron beam impinges, will emit a predetermined substantially constant quantity of secondary electrons. Some of these secondaries will be attracted to points on screen 6 which are not subjected to bombardment. Others will be drawn to auxiliary electrode 7a. But, by means of a suitable potential applied to electrode 7 through resistor 14, the electrode may be caused to attract and collect a substantial number of these electrons so as to produce, at point 15, a potential which remains substantially constant throughout the trace. If the signal supplied from source 11 to electrode 7 is periodic at the trace repetition frequency, the trace will be repeated in the following scan, and points upon which the electron beam impinges as it sweeps out the same trace will emit secondary electrons but to a lesser extent for each point than in the preceding trace. However, the quantities of electrons emitted for different points on the same trace will be the same and the potential developed at point 15 will remain essentially constant. On the next succeeding trace, depending upon the characteristics of the screen, the secondary emission from the various points previously traced may be slightly less than in the preceding trace, or may be substantially the same. At all events, after several repetitions of the identical trace on screen 6, the secondary emission from all points thereon will reach equilibrium and will be the same for successive traces. When, however, the signal supplied to electrode 7 from source 11 departs from periodicity, the electron beam will be caused to describe a trace which differs, at least in part, from that previously scanned. Each point not previously scanned will emit more secondary electrons than would a point excited on the preceding scan. These additional electrons, some of which are collected by electrode 7, will produce a change in the potential at point 15.

Thus the potential across resistor 14 will remain essentially constant so long as the signal supplied from source 11 to electrode 7 is periodic at the trace repetition frequency, and changes in this potential will be indicative of departures from periodicity. It will be noted however, that there is also present at point 15 the video-modulated 60 megacycle carrier from source 11. Since the signal developed at point 15 by the secondary electrons collected by electrode 7 will comprise components in the video frequency band, and since the signal from source 11 comprises carrier and sideband components at an appreciably higher frequency, selection of the former signal can readily be effected by means of a low-pass filter here shown as comprising inductors 18 and 19 and condensers 20 and 21. Included in the connection from point 15 to the input of the filter is an isolating resistor 16 adapted to maintain a relatively high impedance input to axial electrode 7 from the source 11 of the signal whose aperiodicity is to be detected. Also included in the connection is a coupling condenser 17 adapted to exclude from the filter the D.-C. component developed at point 15 in the presence of a periodic signal. The output of the low-pass filter may be amplified in a suitable video amplifier 22 whose output will then be indicative of departures from periodicity at the trace repetition rate of signals from source 11.

Upon initial consideration, it might appear necessary, for satisfactory operation of the system according to the invention, that the carrier frequency of the signal supplied from source 11 be a multiple of the trace repetition frequency, in order that the modulated signal supplied to electrode 7 be periodic at the trace repetition frequency when the modulating signal is periodic. However, it appears that this is not essential if the carrier frequency is made sufficiently high so that the trace produced in response thereto is not resolvable by screen 6. Moreover, although it has been assumed that the video signal will be recurrent at a substantially constant rate, and that therefore the spiral scan produced in response to the signals from deflecting signal generator 8 should likewise recur at the same constant rate, these conditions need not necessarily obtain in practice. For example, when the invention is applied in a radar target motion indicator system, if the rate at which pulses of high frequency energy are transmitted varies, and if, accordingly, the rate at which a given target area is successively observed likewise varies, then received signals will recur, but not periodically. Hence the trace repetition rate may be varied in a like manner and the system will still operate to compare successive signals returned from corresponding target areas. Thus, as already pointed out, the invention is not limited in its application to a system for detecting aperiodicity of a signal which normally recurs at a predetermined uniform rate, but, in a broader sense, is useful for comparing any successively occurring signals even though they be not periodic. It is deemed unnecessary to indicate in detail the numerous variations in the system shown which may be made to adapt it to other specific uses. These will be apparent to those skilled in the art in view of the present disclosure.

The use, in the system just described, of a high frequency carrier modulated by the video signal whose aperiodicity is to be detected not only makes it possible conveniently to separate the secondary electron output from tube 1 from the input signal to electrode 7 by means of a frequency discriminatory device in the form of a low-pass filter, but it also permits increased output. This fact will be more readily appreciated by referring to Figure 4 which illustrates in detail a portion of the spiral trace described on the screen of tube 6 (with curvature of the trace removed). Thus it will be noted that the actual trace of the beam will be deflection-modulated at the carrier frequency within an envelope of amplitude which varies at the video rate. During a portion of one trace the beam may sweep back and forth within the area indicated by the parallel vertical lines. During the same portion of the succeeding trace, if the modulating signal differs in waveform, an additional area may be scanned as represented by the cross-hatched portions 23 and 24. Hence the increase in secondary emission output will be proportional to the cross-hatched areas and will be appreciably greater than it would be if the traces corresponded only to the envelopes of the areas shown in Figure 4, as would be the case if the video signal alone were supplied to electrode 7 rather than a high frequency carrier modulated thereby.

It will be understood that the invention is not limited in scope to the use of the particular form of tube shown in the embodiment of Figure 1, nor to the spiral form of trace there employed for the reasons hereinbefore mentioned. The principles of the invention would, for example, be equally applicable to a system employing a linear scan in which the beam is deflected in a direction normal to the trace in response to the signals to be compared. Such an arrangement, however, would lack certain advantages of the embodiment shown.

Figure 2 shows another embodiment of the invention employing a cathode ray tube 25 which may be substantially indentical to tube 1 of Figure 1, comprising: an electron gun 26, an intensity controlling grid 27, vertical and horizontal deflecting plates 28 and 29, an axial electrode 31, an auxiliary deflecting electrode 31a, and a target screen or surface 30. In this embodiment, as in the one previously described with reference to Figure 1, signals are supplied from a source 32 through connections 33 and 34 to deflecting plates 28 and 29 respectively to cause the electron beam repeatedly to describe a spiral trace on screen 30. Also, as in the embodiment of Figure 1, the signals to be compared may be supplied from source 35 to the axial deflecting and collecting electrode 31. These signals may be modulated upon a high frequency carrier (e. g. 60 megacycles) and, under these circumstances, the connection from the source to the axial electrode may include a series resonant circuit comprising condenser 36 and inductor 37 tuned to the carrier frequency. In this instance, however, there is also supplied to the intensity control grid 27, from a source 38, a signal of somewhat higher frequency (e. g. 90 megacycles) than the carrier frequency of the signal from source 35. By modulating the intensity of the beam at this frequency, the secondary electron output from screen 30 will be caused to vary at the beam intensity modulation frequency, and the secondary electron output appearing at point 39 will therefore comprise a 90 megacycle carrier signal modulated by lower frequency variations in the secondary emission of screen 30 produced whenever the signal from source 35 differs in successive scans. Hence, in this instance, the desired output will lie in a band higher than that occupied by the modulated carrier wave input signal from source 35 and may be separated therefrom by means of a high-pass filter comprising condensers 40 and 41 and inductors 42 and 43. As in the previously described embodiment, the connection from point 39 to the input of the high-pass filter may include an isolating resistor 44 adapted to maintain a high impedance input to the axial electrode 31. The output from the filter may be supplied to a conventional high frequency amplifier 45 to provide an amplified signal indicative of differences in the signals compared. In the embodiment shown, this amplifier may be designed to amplify the 90 megacycle carrier and its sidebands resulting from modulation by the video signal. It will be noted that, in the present embodiment, it is not essential that the signals whose waveforms are to be compared be first modulated upon a high frequency carrier. Thus, for example the signal from source 35 might comprise merely the video signal itself unmodulated upon the 60 megacycle carrier. If this be done, however, the trace of the electron beam on the tube screen will not be deflection-modulated at a high frequency within the video signal envelope in the manner explained with reference to Figure 4. The particular advantage of this mode of operation will therefore not obtain, although the other features of the invention will still be present.

It will, of course be understood that the invention is susceptible of embodiment in ways other than those here shown, such as will occur to those skilled in the art in view of the foregoing disclosure. Accordingly the scope of the invention is to be regarded as subject only to those limitations imposed by the appended claims.

We claim:

1. In a signal comparator, means for forming an electron beam, a secondary-electron emissive target screen, means for causing said beam to describe on said screen a trace normally recurrent at a predetermined frequency, a source of a signal consisting of frequency components within a predetermined first frequency range, means responsive to said signal to modify said trace and responsive to variations in said signal which are not periodic at said predetermined frequency to render said trace non-recurrent and to cause variations in the secondary emission from said screen comprising frequency components within a second frequency range external to said first frequency range, said last-named means comprising an electrode supplied with said signal and disposed in deflection-controlling relation to said beam and so as to intercept secondary electrons emitted from said screen, and means connected to said electrode for detecting said variations in the secondary emission from said screen, said last-named means including a frequency discriminatory device operative to discriminate against frequency components within said first frequency range.

2. In a signal comparator, means for forming an electron beam, a secondary-electron emissive target screen, means for causing said beam to describe on said screen a trace normally recurrent at a predetermined frequency, a source of modulated carrier wave signal consisting of frequency components within a predetermined first frequency range, means responsive to said signal to modify said trace and responsive to modulation of said carrier wave signal which is not periodic at said predetermined frequency to render said trace non-recurrent and to cause variations in the secondary emission from said screen comprising frequency components within a second frequency range external to said first frequency range, said last-named means comprising an electrode supplied with said signal and disposed in deflection-controlling relation to said beam and so as to intercept secondary electrons emitted from said screen, and means connected to said electrode for detecting said variations in the secondary emission from said screen, said last-named means including a frequency discriminatory device operative to discriminate against frequency components within said first frequency range.

3. In a signal comparator, means for forming an electron beam, a secondary-electron emissive target screen, means for causing said beam to describe on said screen a trace normally recurrent at a predetermined frequency, a source of a signal consisting of frequency components within a predetermined first frequency range, means responsive to said signal to modify said trace and responsive to variations in said signal which are not periodic at said predetermined frequency to render said trace non-recurrent and to cause variations in the secondary emission from said screen comprising frequency components within a second frequency range external to said first frequency range, said last-named means comprising an electrode supplied with said signal and disposed in deflection-controlling relation to said beam and so as to intercept secondary electrons emitted from said screen and means for varying the intensity of said beam, and means connected to said electrode for detecting said variations in the secondary emission from said screen, said last-named means including a frequency discriminatory device operative to discriminate against frequency components within said first frequency range.

4. Apparatus according to claim 1 in which said means for causing said beam to describe on said screen a trace recurrent at a relatively low frequency is operative to cause said beam to describe a substantially spiral trace on said screen and in which said deflecting electrode is substantially axially disposed with reference to said trace.

DAVID E. SUNSTEIN.
ARTHUR H. MANKIN.

REFERENCES CITED

The following references are of record in the file of this patent:

UNITED STATES PATENTS

| Number | Name | Date |
|---|---|---|
| 2,210,034 | Keyston | Aug. 6, 1940 |
| 2,250,528 | Gray | July 29, 1941 |
| 2,272,842 | Hikok | Feb. 10, 1942 |
| 2,372,450 | Rajchman et al. | Mar. 27, 1945 |
| 2,395,744 | Kent | Feb. 26, 1946 |
| 2,412,965 | Chevigny et al. | Dec. 24, 1946 |
| 2,413,276 | Wolff | Dec. 24, 1946 |
| 2,422,135 | Sanders | June 10, 1947 |
| 2,437,173 | Rutherford | Mar. 2, 1948 |
| 2,451,005 | Weimer et al. | Oct. 12, 1948 |
| 2,457,580 | Mayer | Dec. 28, 1948 |
| 2,480,978 | Sunstein | Sept. 6, 1949 |
| 2,512,144 | Emslie | June 20, 1950 |